Feb. 22, 1927. Re. 16,560

T. HUCK ET AL

LAMP SHADE

Original Filed Jan. 11, 1923

INVENTORS
T. Huck
T. Meaney
BY F. Lederman
ATTORNEY

Reissued Feb. 22, 1927. Re. 16,560

UNITED STATES PATENT OFFICE.

THEODORE HUCK AND THOMAS MEANEY, OF BROOKLYN, NEW YORK, ASSIGNORS, BY DIRECT AND MESNE ASSIGNMENTS, TO HOME-O-LITE CO., INC.

LAMP SHADE.

Original No. 1,494,422, dated May 20, 1924, Serial No. 611,941, filed January 11, 1923. Application for reissue filed May 18, 1926. Serial No. 110,003.

The main object of this invention is to provide a lamp shade having a number of plies of homogeneous cloth fabrics securely united and formed into any bi-laterally symmetrically ornamental shape to make an artistic article of this class.

Another object is to provide metallic flexible grips on the lamp shade suitable to engage a bulb for supporting said lamp shade. These and other objects will become apparent in the description below, in which characters of reference refer to like-named parts in the drawing.

Referring briefly to the drawing, Figure 1 is an elevational view of an electrical table lamp, showing the lamp shade in the preferred form mounted thereon.

Figure 1:
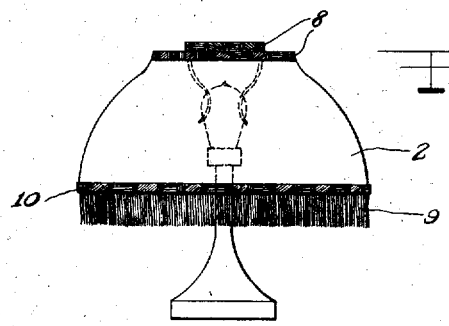
Figure 2:
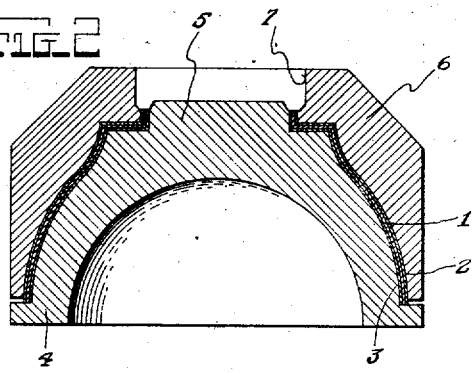
Figure 2 is an elevational sectional view thru the mould and core, showing the plies of fabric being moulded into form.
Figure 3:
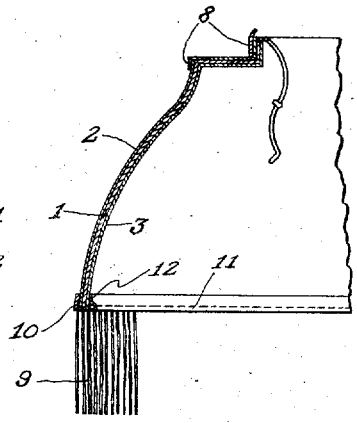
Figure 3 is an enlarged fragmentary sectional elevational view of the lamp shade, showing the construction of the same.
Figure 4:
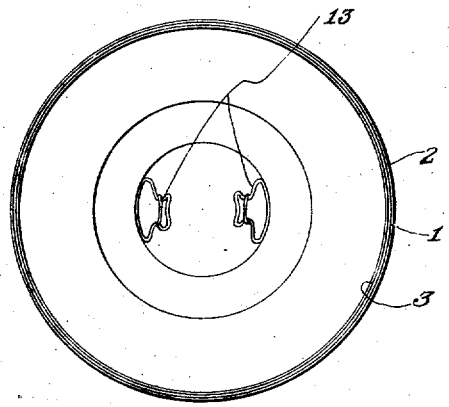
Figure 4 is a bottom plan view of the lamp shade, showing particularly the grip ring which grasps the bulb of a table lamp.

Describing the drawing in detail, the numeral 1 indicates the body material of the lamp shade which is preferably composed of buckram or similar material which, before being formed, is circular in shape and has a relatively large concentric hole at its centre. An outer layer of fabric 2 is cut to a similar size and shape as that of the body buckram and forms the exterior cover of a lamp shade. An internal fabric member 3, identical in size and shape to the buckram body 1, covers the internal surface of the lamp shade. These covers 2 and 3 can be made of any colored fabric desired, the preferred practice being to tint the outer cover 2 with some dark color, while the inner cover 3 is tinted with a color which has a high reflective index.

In fabricating the lamp shade, the buckram body 1 has both its surfaces treated with a desirable glue. The outer cover 2 and inner cover 3 are then applied to the respective faces of the body. After the three members are thus united, they are ready to be formed.

The forming means consists of two members, the mould 6 and the core 4, with the latter resting upon the table. The glued members 1, 2, and 3 are slipped over the hub 5 of the core. The mould 6 is formed similar interiorly to the contour of the core to conform to the shape of said core and has an aperture 7 formed at the top. Said mould 6 is then slipped over the hub 5 of the core member 4 with the glued fabric members 1, 2, and 3 between the core 4 and the mould 6. Both the core 4 and the mould 6 are then tightly pressed together so as to form the cloth members 1, 2, and 3 into the desired shape. When this operation has been accomplished, the whole device is then exposed to heat of a moderate temperature and allowed to stand for an interval of time, until members 1, 2, and 3 are formed into the new shape. When the lamp shade has been formed, with this mould and core, and is then taken out of the mould, no folds or partial folds will appear on the fabric, as are seen in the ordinary lamp shades to the detriment of their appearance. Ornamentation, such as trimmings 8, may then be attached to the various edges of the lamp shade at the top. Fringing 9 may be sewed to the bottom edge of the lamp shade on the exterior surface of member 3 and covered with braid trimming 10, the latter serving the double purpose of concealing the method of attaching the fringing and of acting as ornamentation. A shaper ring encircles the lower edge of the lamp shade, is stitched to the inner fabric 3 and covered by braiding 12 which acts as a concealing agent for the ring. The drawing illustrates a pair of grips 13 which are attached to the upper end of the lamp shade and are composed of a resilient material so that when applied to a bulb or light they will grip the same and retain the lamp shade in place over an electric lamp. It is to be noted that applicants do not limit themselves to the particular design of the lamp shade shown, as any form desired can be made thru this process by simply changing the contour of the mould and core. It is also to be understood that any kind of braiding or ornamentation may be used, for the fringing such as tassels without departing from the spirit and scope of the invention.

What we claim and desire to secure by Letters Patent is as follows:

In a lamp shade, a buckram body, the surfaces of said body being treated with adhesive material, cloth of similar conformation to the body attached to the treated surfaces of said body, a shaped band attached to the lower edge of the formed lamp shade to prevent said shade from buckling, a cloth covering concealing said band, means for supporting said shade comprising a pair of resilient wire grips shaped to engage a bulb.

THEODORE HUCK.
THOMAS MEANEY.